United States Patent
Solomon et al.

(12)

(10) Patent No.: US 6,433,962 B2
(45) Date of Patent: Aug. 13, 2002

(54) LIMITED INITIAL SPECIAL USE TAPE CASSETTE WITH UNLIMITED CONVENTIONAL USE THEREAFTER

(76) Inventors: Merrill Solomon, 10845 Pleasant Hill Dr., Potomac, MD (US) 20854; Craig S. Potter, 8100 Kingsland Dr., Raleigh, NC (US) 27613

( * ) Notice: Subject to any disclaimer, the term of this patent is extended or adjusted under 35 U.S.C. 154(b) by 0 days.

(21) Appl. No.: 09/727,696

(22) Filed: Dec. 4, 2000

Related U.S. Application Data (63) Continuation-in-part of application No. 09/212,566, filed on Dec. 16, 1998, now Pat. No. 6,155,510.

(51) Int. Cl.⁷ ............................................. G11B 23/02
(52) U.S. Cl. ...................................... 360/132; 242/343
(58) Field of Search ........................ 360/132; 242/343, 242/343.1, 343.2, 346

(56) References Cited

U.S. PATENT DOCUMENTS

| | | |
|---|---|---|
| 3,584,506 A | 6/1971 | Smatko |
| 3,612,774 A | 10/1971 | Wiklund |
| 3,831,881 A | 8/1974 | Tucker |
| 4,274,605 A | 6/1981 | Gruber, Jr. |
| 4,351,497 A | 9/1982 | Kiessling et al. |
| 4,466,584 A | 8/1984 | Chevalier et al. |
| 4,482,104 A | 11/1984 | Saito |
| 4,512,535 A | 4/1985 | Dickson et al. |
| 4,575,778 A | 3/1986 | Vogelgesang |
| 4,604,671 A | 8/1986 | Oishi |
| 4,632,335 A | 12/1986 | Dickson et al. |
| 4,660,115 A | 4/1987 | Westfall et al. |
| 4,660,116 A | 4/1987 | Westfall et al. |
| 4,702,434 A | 10/1987 | Brauer |
| 4,763,218 A | 8/1988 | Westfall et al. |
| 4,801,107 A | 1/1989 | Dixon et al. |
| 4,802,048 A | 1/1989 | Perkins et al. |
| 4,842,217 A | 6/1989 | Vinson |
| 4,847,718 A | 7/1989 | Miller et al. |
| 4,874,143 A | 10/1989 | Armstrong et al. |
| 4,928,905 A | 5/1990 | Granzotto et al. |
| 4,942,492 A | 7/1990 | Che |
| 5,034,841 A | 7/1991 | French |
| 5,052,634 A * | 10/1991 | Bushwood et al. ...... 242/343.2 |
| 5,130,879 A | 7/1992 | Weiley |
| 5,152,621 A | 10/1992 | Tsuji |
| 5,228,637 A | 7/1993 | Granzotto |
| 5,454,528 A | 10/1995 | Shanahan |
| 5,473,688 A | 12/1995 | Wiedemer |
| 5,781,384 A * | 7/1998 | Wiedemer .................... 360/132 |
| 6,155,510 A * | 12/2000 | Solomon et al. ............. 242/343 |

* cited by examiner

Primary Examiner—Brian E. Miller
(74) Attorney, Agent, or Firm—Nixon & Vanderhye P.C.; Frank P. Presta (57) ABSTRACT

A limited use tape cassette comprising a housing enclosing a tape spooled to pass from a rotatable supply reel to a rotatable take-up reel during tape play, and from the take-up reel to the supply reel during tape rewind. A follower arm is pivotally mounted on the housing and is biased to engage spooled tape on the one of the reels, preferably the supply reel. An erase arm is pivotally mounted on the housing and is movably and releasably connected to the follower arm. The erase arm has a tape erase head thereon and is biased toward the take-up reel. Upon predetermined movement of the follower arm which results from predetermined tape movement between the reels, the erase arm is released from the follower arm to move the erase head into engagement with the tape on the take-up reel to erase it as it is being rewound onto the supply reel. After the erased tape is rewound onto the supply reel, the erase arm moves the erase head to an inoperative position to enable the erased tape to be reused.

22 Claims, 11 Drawing Sheets

LIMITED INITIAL SPECIAL USE TAPE CASSETTE WITH UNLIMITED CONVENTIONAL USE THEREAFTER

CROSS REFERENCE TO RELATED APPLICATION

The present application is a continuation-in-part of Application Ser. No. 09/212,566, filed on Dec. 16, 1998 (U.S. Pat. No. 6,155,510 to issue on Dec. 5, 2000), the subject matter of which is incorporated herein by reference.

BACKGROUND OF THE INVENTION

1. Field of the Invention

The present invention relates to a limited-use tape cassette, such as a video tape cassette that permits only a predetermined number of viewings of a video movie. The preferred exemplary embodiment enables at least one complete play of the tape and at least one full rewind so as to insure at least a predetermined limited number (e.g., two) of substantially unfettered complete uses of the cassette. Thereafter, the cassette tape is erased and may be used in a conventional manner to record other subject matter.

2. Related Art

Video rental stores typically rent video cassettes for a fixed fee that enables the renter to view the video an unlimited number of times over a prescribed time period. Renters typically are required to pay additional daily rental fees if the video is kept beyond the prescribed initial time period. To accommodate this arrangement, video rental stores must keep detailed renter, accounting and inventory records—as well as check returned cassettes and return them to the rental inventory. The renter, on the other hand must view the rented video soon after acquiring it and then make a prompt return trip to the rental store (to minimize rental fees).

It would be desirable to simply sell non-returnable or reusable video cassettes on a pay-per-view or limited-use basis. If this could be done, it would no longer be necessary for the video store to check and re-stock inventory returns or to administer complicated renter accounts and/or return/restocking costs. In addition, the transaction can now be a sale rather than a rental thus facilitating its occurrence in any store, not just a specialty rental store. The ability to move the transaction from a specialty store to a store the potential customer already visits for other purchases is a significant benefit. Purchasers of limited-use videos would also benefit in that the hassles associated with substantially immediate viewing and/or returning of the rented video cassette could be eliminated. In addition, because of the economics of this limited use approach, the current difficulty of maintaining sufficient rental stock of hit movies to fully satisfy consumer demand is avoided (currently approximately 20% to 30% of rental consumers cannot find a desired hit movie on a first single trip to the video rental store).

Although there have been many prior attempts to provide such pay-per-view or limited-use tape cassettes, they all have drawbacks that have so far prevented wide-spread usage of such limited-use cassettes. For example, some utilize complicated mechanisms that may be too expensive to manufacture and/or that may be prone to failure or exhibit another annoying adverse impact on a normal unfettered use (e.g., including normal rewind operations to see some portion of the video again which might have been missed during an unexpected phone call or the like) during the authorized number of viewings.

Some prior attempts to provide a limited-use cassette are represented by the following:

U.S. Pat. No. 4,466,584—Chevalier et al (1984)
U.S. Pat. No. 4,802,048—Perkins (1989)
U.S. Pat. No. 5,228,637—Granzotto (1993)
U.S. Pat. No. 5,473,688—Wiedemer (1995)

Chevalier and Perkins add a complicated ratchet-wheel counter arrangement driven by an inter-spool double follower (e.g., a V-shaped inter-reel follower) and which, after a predetermined number of full (or partial) play cycles, locks the cassette from all further use. In Perkins, this locking occurs if the cartridge is thereafter removed from the tape deck and/or it moves an erase magnet into position to erase the tape as it is being thereafter played or rewound.

Granzotto discloses a tape cassette that allows complete play only once. A follower arm follows the wound tape radius on the take-up reel. When a predetermined amount of tape is wound onto the take-up reel, a separate internal lock mechanism is set such that when the tape is thereafter rewound, a free locking arm is displaced into the path of a tooth carried by an inner locking member on the take-up reel (e.g., when a predetermined amount of tape has been rewound onto the supply reel). Thereafter, forward feeding of the tape is inhibited because the locking member locks the take-up reel by virtue of a pawl.

Wiedemer uses a programmed microprocessor control in conjunction with a machine-readable label on the cassette and a controllable internal cassette lock to limit the number of play cycles to some predetermined amount.

Although these prior art examples demonstrate a long-felt need in the art for a limited-use tape cassette, they all involve relatively complex mechanisms which may be prone to failure (or relatively easy to defeat by the consumer) and at least some of which may interfere with an unfettered use of the cartridge during the authorized period of use.

Other prior attempts have employed various types of oneway mechanical clutches or other mechanisms so as to prevent rewinding of the cassette. This, however, seriously interferes with a normal licensed usage of a video cassette service as some stopping, rewinding and re-viewing is within the expected realm of usage by a substantial number of customers. Some examples of these anti-reverse approaches are noted below:

U.S. Pat. No. 3,584,506—Edwards et al (1971)
U.S. Pat. No. 3,831,881—Tucker (1974)
U.S. Pat. No. 4,351,497—Kieseling et al (1982)
U.S. Pat. No. 4,482,104—Saito (1984)
U.S. Pat. No. 4,512,535—Dickson et al (1985)
U.S. Pat. No. 4,632,335—Dickson et al (1986)
U.S. Pat. No. 4,702,434—Brauer (1987)
U.S. Pat. No. 4,801,107—Dixon et al (1989)
U.S. Pat. No. 4,874,143—Armstrong et al (1989)
U.S. Pat. No. 4,928,905—Granzotto et al (1990)
U.S. Pat. No. 5,152,621—Tsuji (1992)

Of course, there are also prior art cartridge locking systems which automatically prevent rotation whenever the cartridge is removed from the video player after a play cycle is begun. U.S. Pat. No. 4,604,671—Oishi (1986) is one example of such a mechanism.

A variation on the anti-reverse approach is disclosed in U.S. Pat. No. 5,454,528—Shanahan (1995) where the anti-reverse mechanism is only invoked if the rotational speed exceeds normal play speed during the first portion of the video—thus preventing the renter from fast-forwarding through preliminary advertisement materials.

A number of prior approaches merely incorporate use counters of various types:

U.S. Pat. No. 4,274,605—Gruber, Jr. (1981)
U.S. Pat. No. 4,575,778—Vogelgesang (1986)
U.S. Pat. No. 5,034,841—French (1991)
U.S. Pat. No. 5,130,879—Weiley (1992)

Various other types of cartridge tape-erasing magnets have been employed (some being deployed so as to insure only one play cycle). For example:

U.S. Pat. No. 3,612,774—Wiklund (1971)
U.S. Pat. No. 4,660,115—Westfall et al (1987)
U.S. Pat. No. 4,660,116—Westfall et al (1987)
U.S. Pat. No. 4,763,218—Westfall et al (1988)
U.S. Pat. No. 4,847,718—Miller et al (1989)
U.S. Pat. No. 4,942,492—Che (1990)

Finally, some prior attempts have even gone so far as to physically destroy the tape just after it is first played—on its way to the take-up reel. On example of this approach is:

U.S. Pat. No. 4,842,217—Vinson (1989)

Accordingly, there remains a need for an improved solution to this long-standing problem. The cassette tape of the present invention fills this need and its construction permits the use of the tape as a blank tape in a conventional manner after the initial limited special use of the tape. Accordingly, the tape does not have to be disposed of after the initial permitted special use.

SUMMARY OF THE INVENTION

This invention provides a greatly simplified and improved limited-use tape cassette. The exemplary embodiments provide substantially unfettered use of the cartridge for at least a predetermined number of uses (e.g., one)—including the ability to rewind and review substantially the entire tape at least once. Thereafter, the tape is automatically erased and may be used in a conventional manner to record other subject matter.

In a preferred exemplary embodiment, a follower arm is pivotally mounted on the cassette housing and is spring-biased into engagement with the tape on the supply reel so as to be pivotally movable to different positions depending on the amount of tape on the supply reel. The follower arm is provided with a track of predetermined size and configuration. A pin is mounted for slidable movement in the track and is connected at one end to an erase arm that is pivotally mounted on the cassette housing and is spring-biased in a direction toward the take-up reel. The erase arm has an erase head on the outer end thereof that is positioned to engage the tape on the take-up reel after predetermined incremental movement of the pin through and out of the track.

When the tape is played for the first time so that it travels from the supply reel to the take-up reel, the follower arm is moved and the pin moves incrementally in the track so that the erase arm and erase head are moved to a position nearer the take-up reel. J During the first rewind of the tape onto the supply reel, the follower arm is again moved pivotally to enable the pin to move further incrementally in the track to a position wherein the erase arm and erase head are moved even nearer to the take-up reel. Each play, and rewind cycle, moves the pin incrementally down the track, ever closer to the take-up reel. This continues until the desired number of plays have been reached and then the pin moves out of the track and the erase arm moves pivotally to a position wherein the erase head engages the tape on the take-up reel. When the tape is rewound onto the supply reel, it is erased by the erase head, and the erase head is thereafter moved to an inoperative position after the tape is completely rewound onto the supply reel. Thereafter, the cassette tape may be used in a conventional manner to record other subject matter as desired.

It is noted that the size, total length and configuration of the track in the follower arm will control the pin movement and determine the exact timing of the incrementing, and the number of plays of the tape, before it is automatically erased by the erase head. Within the scope of the present invention, the track may be of any suitable construction to permit the desired number of plays of the tape before it is erased.

It should also be noted that utilizing this track concept not only gives the content owner the ability to limit the viewings of a purchaser, it also gives the purchaser a very user friendly way to view the contents so that there is never a point in the movie at which the viewer cannot rewind or fast forward and watch some favorite scene over and over again. In essence, the viewer could watch at any time a portion of the movie, e.g., either the first two thirds of a movie, or the last two thirds of a movie forever.

A possible commercial embodiment may also include numerical indicia or the like on the erase arm or erase head so that the number of remaining special play cycles for the cassette tape may be conveniently viewed through one or more transparent apertures in the cassette housing.

BRIEF DESCRIPTION OF THE DRAWINGS

These and other objects and advantages of this invention will become apparent from the following more detailed description of the exemplary embodiments taken in conjunction with the accompanying drawings in which.

DETAILED DESCRIPTION OF EXEMPLARY EMBODIMENTS

Figure 1:
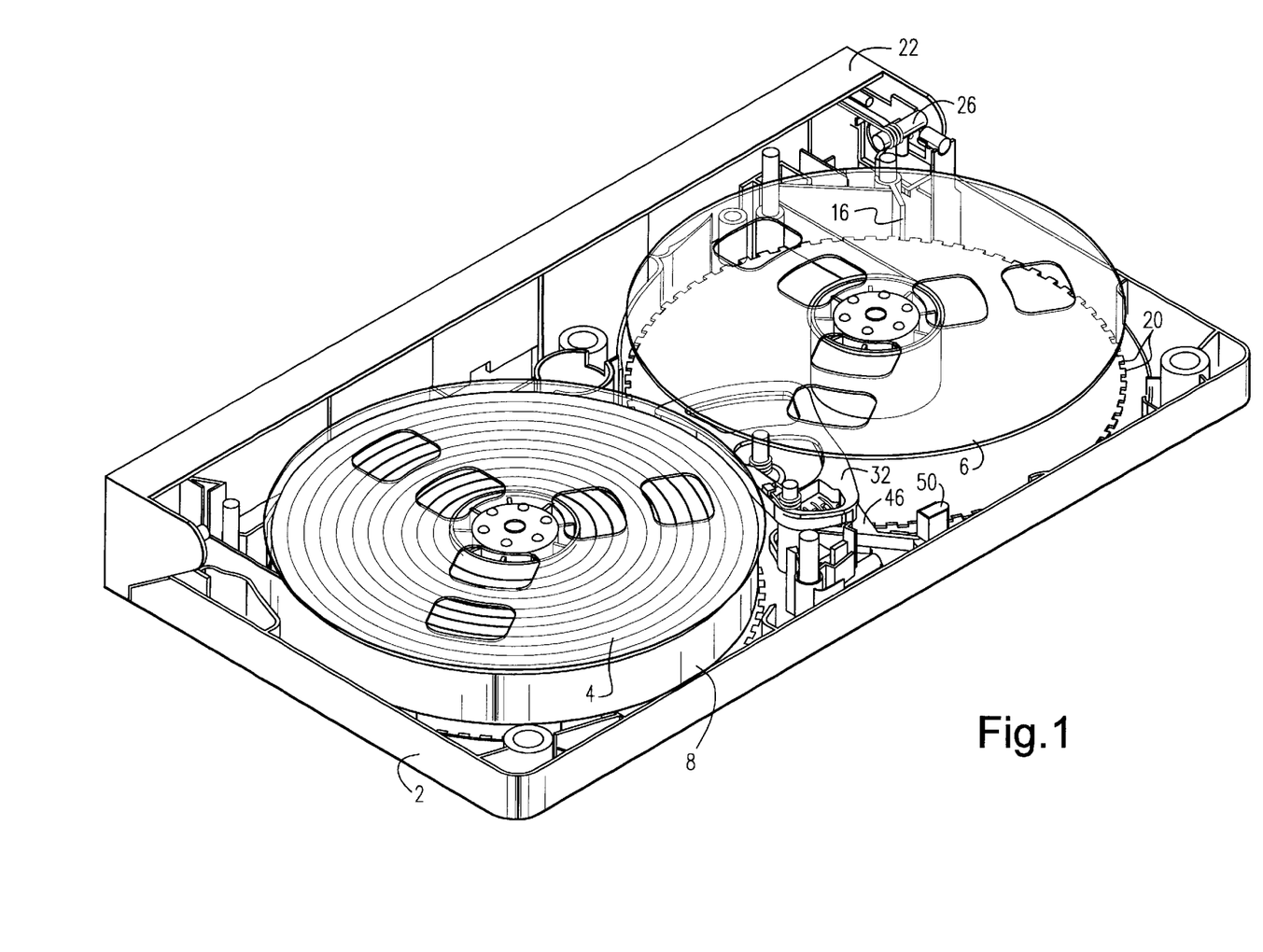
FIG. 1 is a perspective view of a first exemplary embodiment of the video tape cassette of the present invention.
Figure 3:
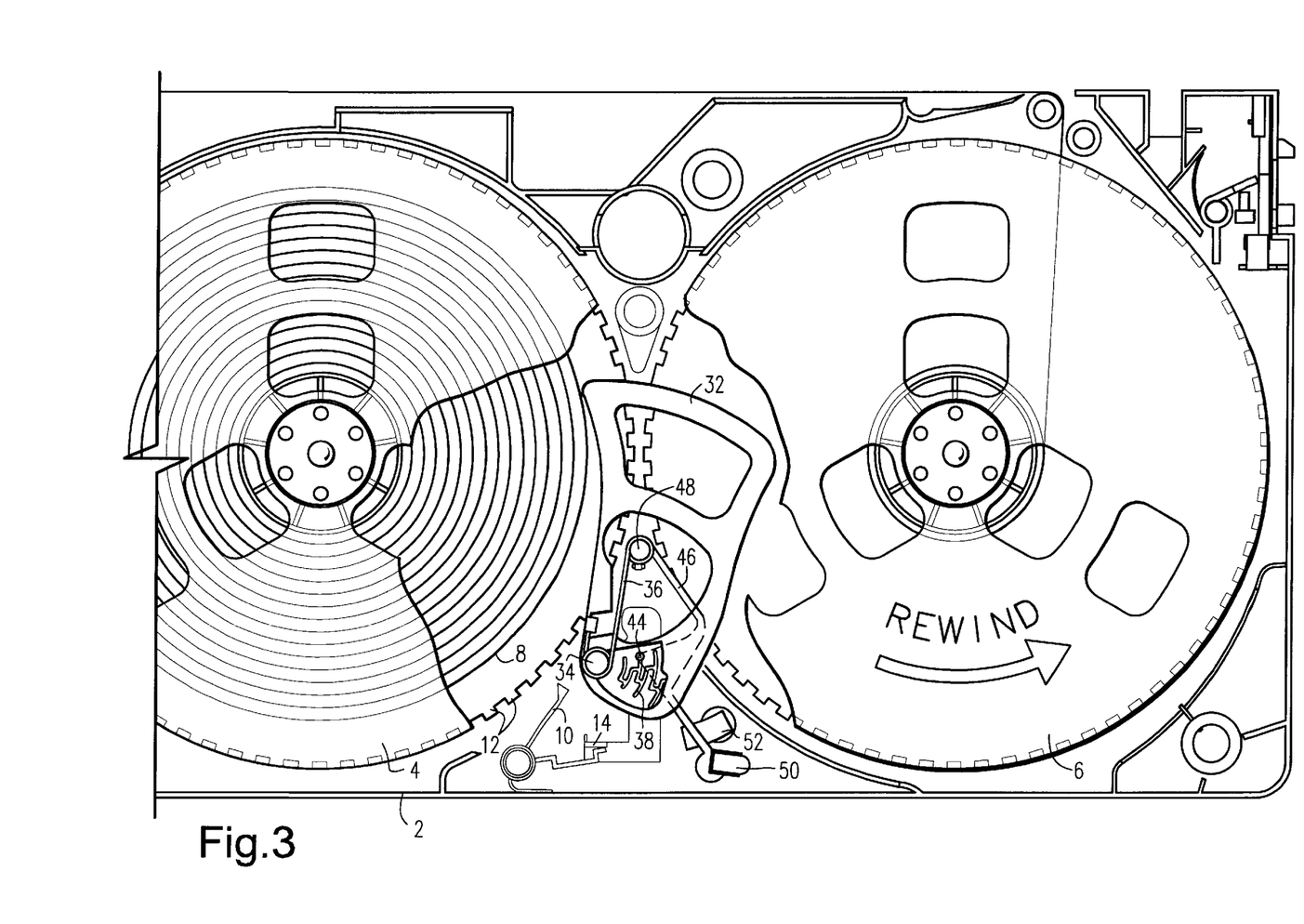
FIGS. 3–8 are top plan views, with parts broken away, of the take-up and supply reels of the tape cassette incorporating structure according to the first exemplary embodiment of the present invention in successive stages of cassette usage.

FIG. 1 illustrates a video tape cassette constructed in accordance with a first exemplary embodiment of the present invention and comprising a housing 2 rotatably supporting a supply reel 4 and take-up reel 6. A suitable tape 8, such as a magnetic video tape, is conventionally supplied from supply reel 4 through a series of rollers and guides past a reading station and onward to take-up reel 6. As shown in FIG. 3, a conventional brake assembly for the supply reel 4 includes a first spring-loaded ratchet pawl 10 which is positioned to engage the teeth 12 on the periphery of the supply reel 4 when the cassette tape is out of a video cassette recorder (VCR). When the cassette is loaded into a VCR, a release device 14 pivots the pawl 10 to the release position shown in FIG. 3.

Figure 2:
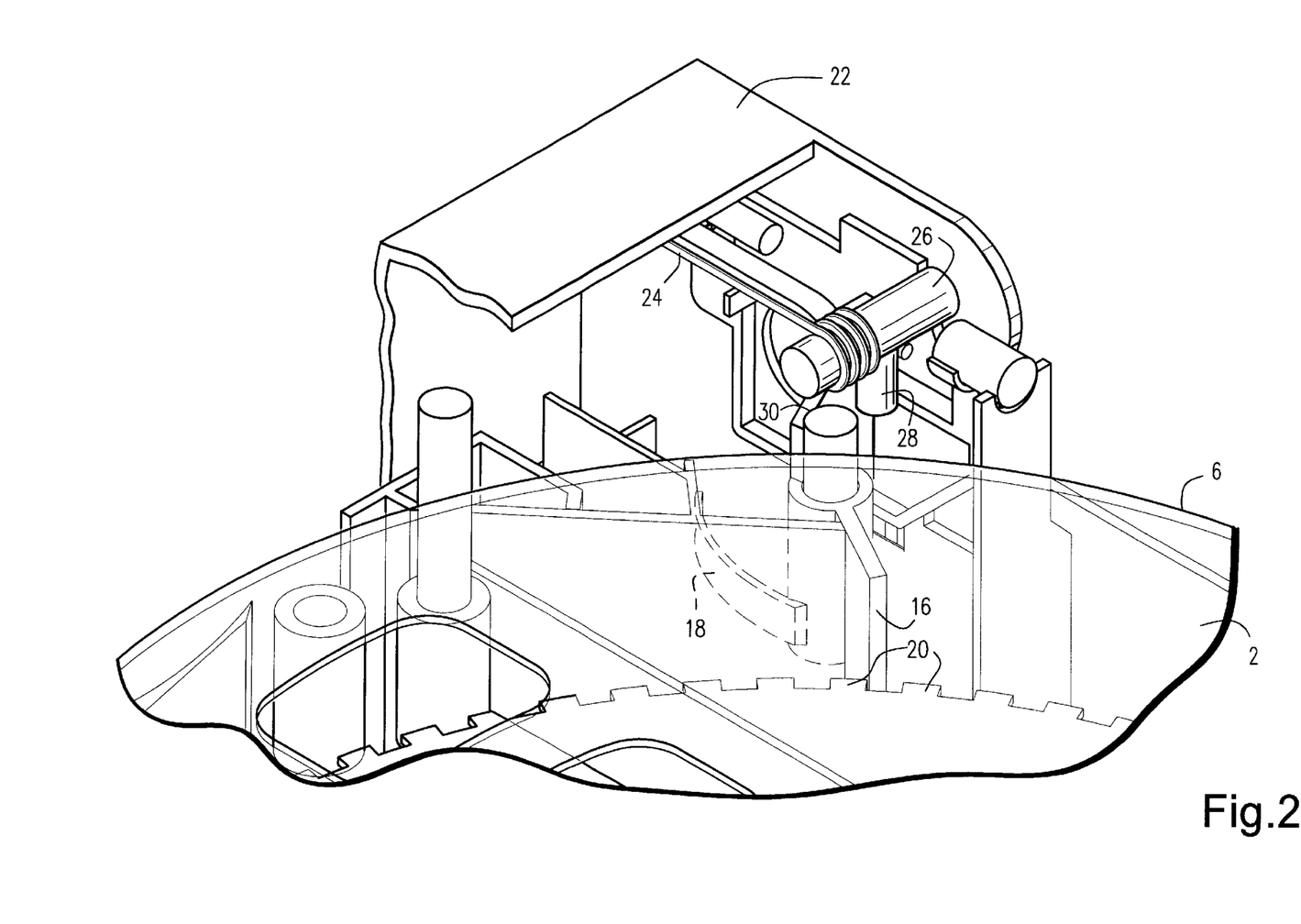
FIG. 2 is an enlarged perspective view of a portion of the tape cassette shown in FIG. 1, illustrating the locking mechanism for the take-up reel.
Figure 2A:
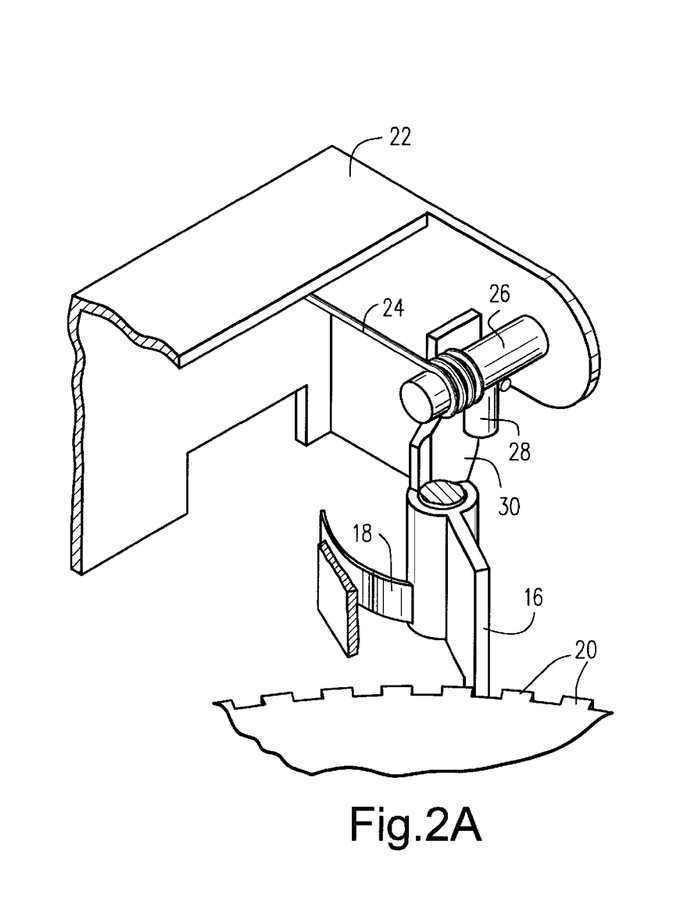
FIG. 2A is a perspective view of the locking mechanism shown in FIG. 2 in a locked position.
Figure 2B:
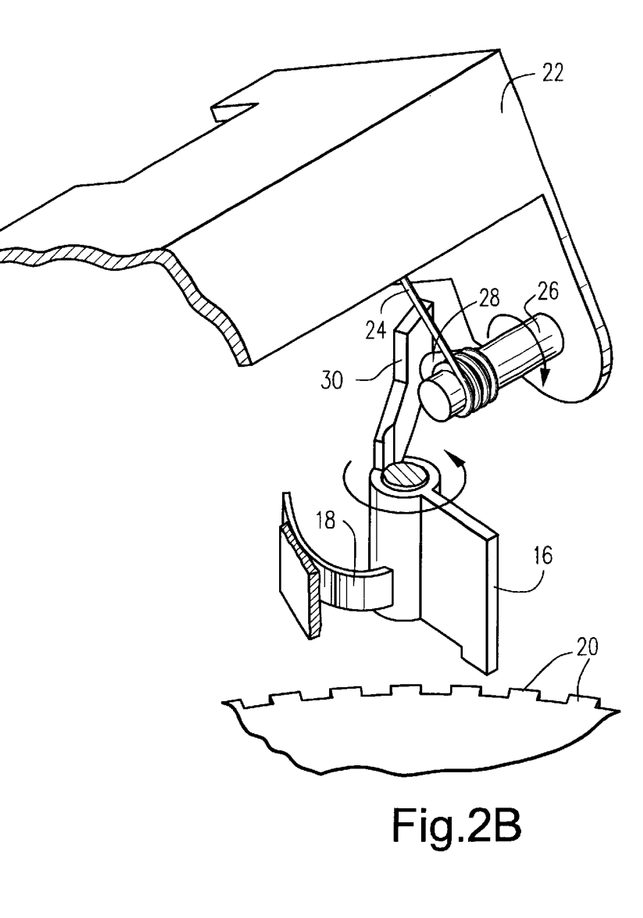
FIG. 2B is a view similar to FIG. 2A showing the locking mechanism in a released position.

Referring to FIGS. 2, 2A and 2B, a brake assembly for the take-up reel 6 comprises a second pawl 16 that is pivotally mounted on the housing 2 and is biased in a clockwise direction by a leaf spring 18 into engagement with the teeth 20 on the take-up reel 6 when the cassette is out of the VCR. A guard door 22 is pivotally mounted on the cassette and is biased to the closed position shown in FIGS. 2 and 2A by a spring 24 mounted on pivot pin 26. The pivot pin 26 includes a transverse extension 28 that is positioned adjacent to an upwardly extending section 30 of the second pawl 16.

When the cassette tape is inserted into a VCR, the guard door 22 thereof is pivoted upwardly against the force of the spring 24 to the position shown in FIG. 2B wherein the transverse extension 28 of the pivot pin 26 engages the upper section 30 of the second pawl 16 to rotate it in a counter-clockwise direction out of engagement with the teeth 20 of the take-up reel 6.

FIGS. 3–9 illustrate in more detail the first exemplary embodiment of structure for effecting the limited use of the tape cassette according to the present invention. A follower arm 32 is pivotally mounted on the cassette housing 2 at 34 and is biased for rotation in a counter-clockwise direction by a spring 36 into engagement with the tape 8 on the supply reel 4 in the manner shown in FIG. 3. Preferably, the end portion of the follower arm 32 in engagement with the tape 8 is curved so as not to damage the tape or impede the travel thereof. The follower arm 32 may be of any suitable configuration other than that shown in FIGS. 3–9 which will perform the functions defined herein.

Also, within the scope of the present invention, the follower arm 32 could be biased into engagement with the tape 8 on the take-up reel 6 rather than the supply reel 4.

From the foregoing description, it will be noted that the follower arm 32 will be rotated by the spring 36 in a counter-clockwise direction toward the center of the supply reel 4 as the tape 8 moves from the supply reel 4 to the take-up reel 6. Thereafter, as the tape 8 is rewound from the take-up reel 6 back onto the supply reel 4, the tape 8 being rewound on the supply reel 4 will engage the follower arm 32 and pivot it in a clockwise direction against the force of the spring 36. Accordingly, the movement of the tape 8 between the supply reel 4 and take-up reel 6 will cause the follower arm 32 to be pivotally moved to the positions shown in FIGS. 3–8 depending on the tape location.

Figure 9:
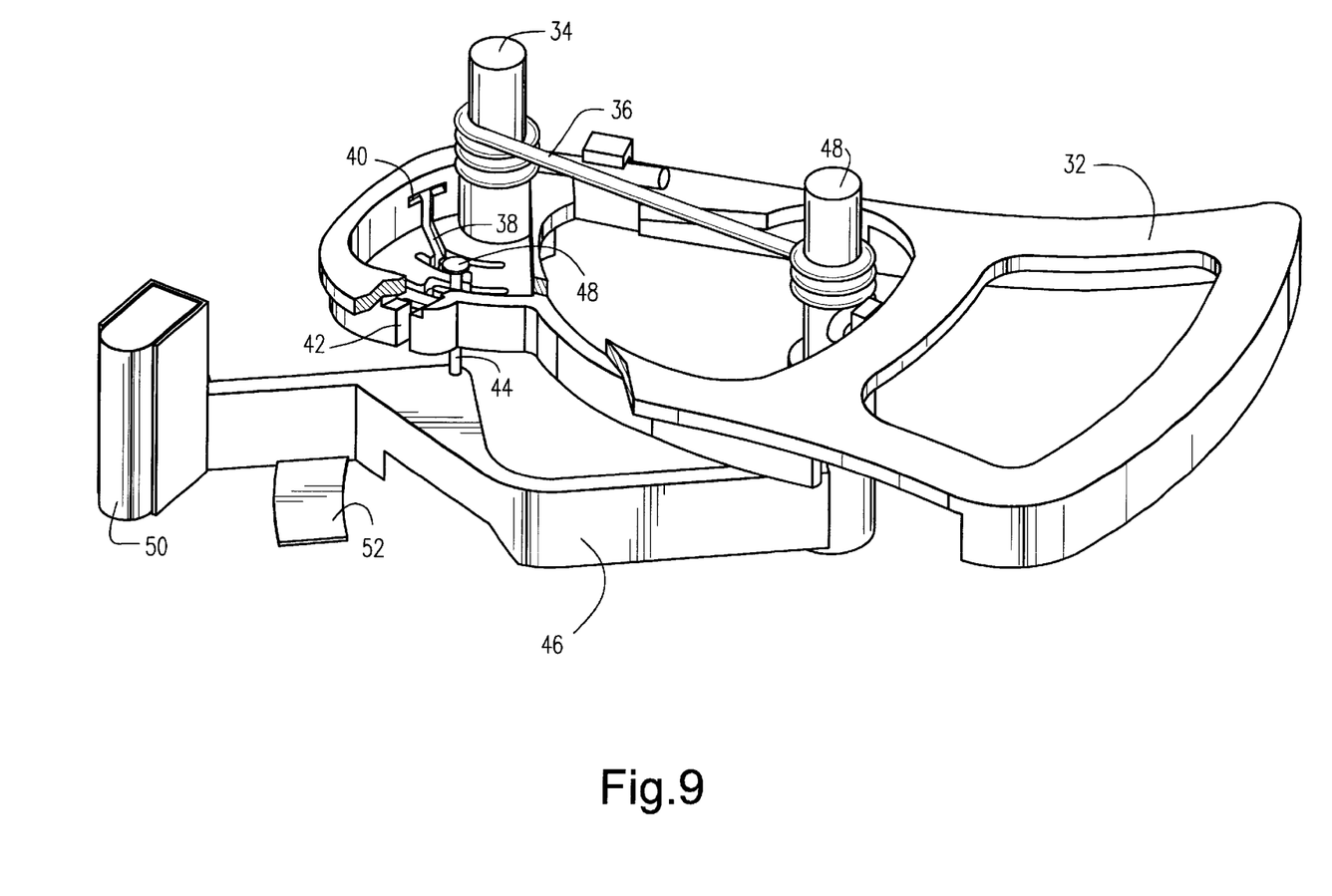
FIG. 9 is an enlarged perspective view of the follower arm, erase arm and erase head of the first exemplary embodiment of the present invention.

Near the pivot point 34, the follower arm 32 is provided with a track 38 of a predetermined size and configuration for a purpose to be more fully described hereinafter. The track 38 may comprise radially or laterally spaced portions that are generally circumferential to the pivot point 34 and transverse or generally radially extending portions that connect the circumferential portions. As shown in FIG. 9, the track 38 may have an entrance opening 40 near the pivot point 34 and an exit opening 42 removed from the pivot point 34.

The upper portion of a pin 44 is positioned in the track 38 for slidable movement therein. The lower end of the pin 44 is connected to the mid-portion of an erase arm 46 and the upper end of the pin 44 has an enlarged head 48 for the purpose of retaining it in the track 38 during movement of the cassette. The erase arm 46 is pivotally mounted on the housing 2 at its inner end at 48 and is biased for rotation in a counter-clockwise direction by the spring 36. A magnetic erase head 50 is mounted on the outer end of the erase arm 46. An extension 52 extends laterally from the erase arm 46 near its outer end for a purpose to be described hereinafter.

The size, total length, configuration and relative spacing of the track 38, pin 44 and erase arm 46 are such that the pin 44 will move incrementally from a point near the inner end or beginning of the track 38 to the exit opening 42 thereof under the force of the spring 36 and in response to the reciprocating pivotal movement of the follower arm 32 caused by the spring 36 and the movement of the tape 8 as hereinbefore described. To effect this operation, the pin 44 preferably is mounted on a mid-portion of the erase arm 46 that is offset from the inner portion thereof and in generally radial alignment with the erase head 50. The erase arm 46 may be of any suitable construction to effect this result.

Referring to FIG. 3 wherein the tape 8 is on the supply reel 4 and is a condition to be played for the first time, the follower arm 32 is in engagement with the outer portion of the tape 8 under the influence of the spring 36 which biases it in a counter-clockwise direction, and the pin 44 is disposed in a portion of the track 38 near the inner end thereof for the purpose of maintaining the erase arm 46 and erase head 50 in a position spaced from the take-up reel 6 against the force of the spring 36.

Figure 4:
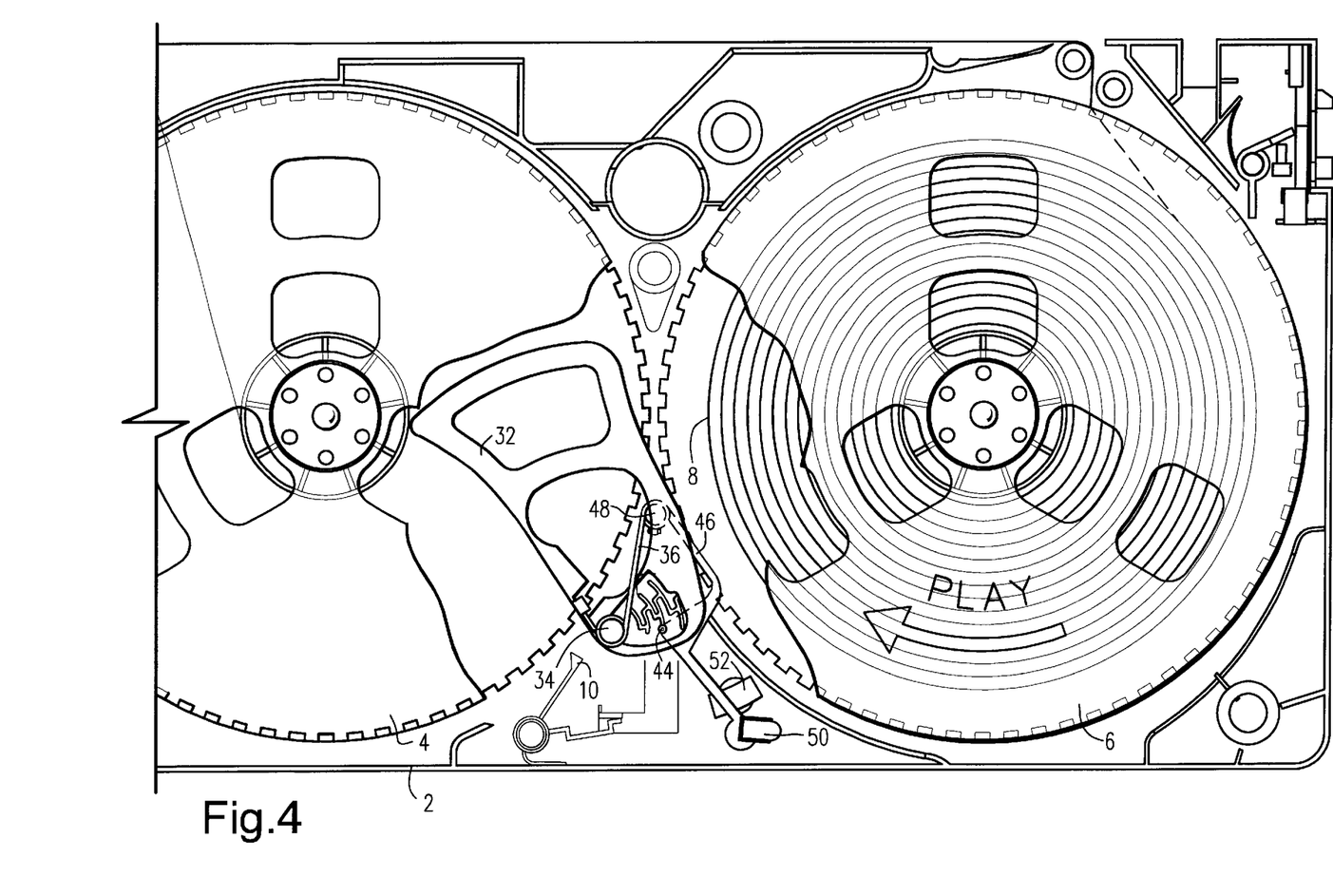

When the tape 8 is played for the first time so that it travels from the supply reel 4 to the take-up reel 6, the follower arm 32 is moved in a counter-clockwise direction by the spring 36 to the position shown in FIG. 4 and the pin 44 is moved incrementally outwardly in the track 38 so that the erase arm 46 and erase head 50 are moved by the spring 36 to a position nearer the take-up reel 6.

Figure 5:
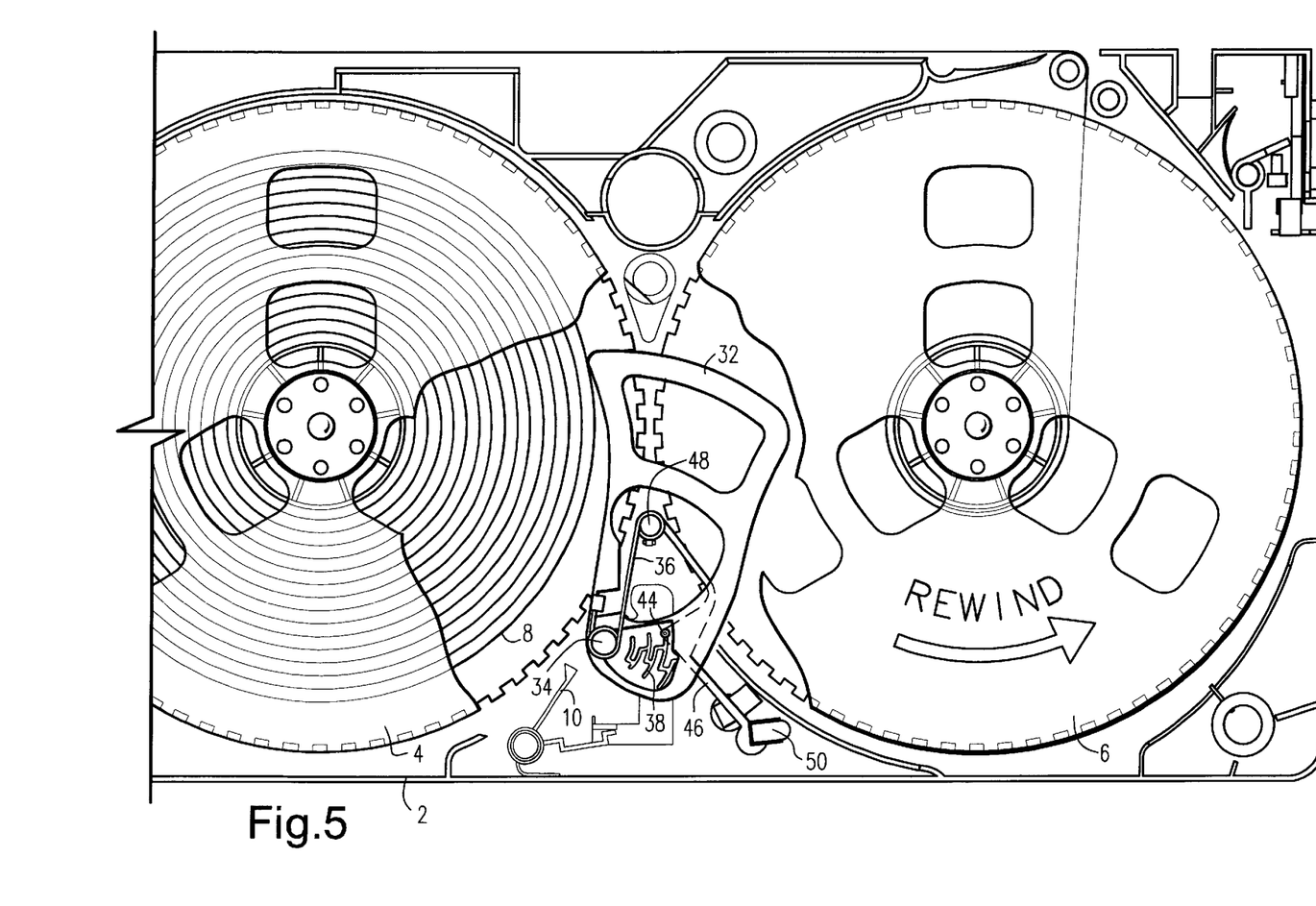

During the first rewind of the tape 8 back onto the supply reel 4, as shown in FIG. 5, the follower arm 32 is again moved pivotally in a clockwise direction by the tape 8 on the supply reel 4 to enable the pin 44 to move further incrementally outwardly in the track 38 to a position wherein the erase arm 46 and erase head 50 are moved even nearer to the take-up reel 6 under the force of spring 36.

Figure 6:
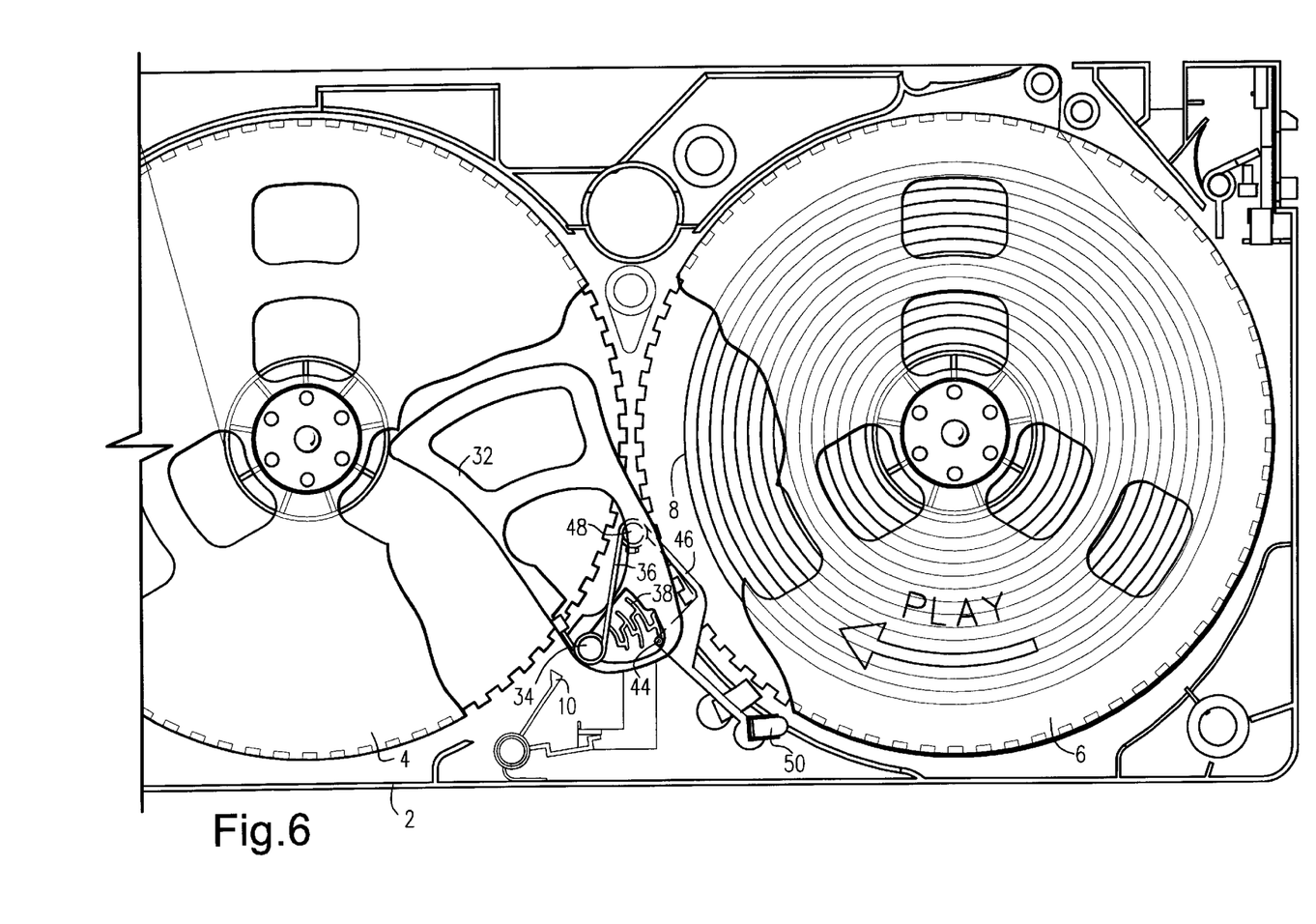

Upon the completion of the playing of the tape 8 for the second time so that it is fully wound on the take-up reel 6, as shown in FIG. 6, the movement of the follower arm 32 in a counter-clockwise direction under the influence of the spring 36 causes the pin 44 to move further incrementally in the track 38 such that the erase arm 46 is moved in a counter-clockwise direction by the spring 36 to move the erase head 50 even closer to the tape 8 on the take-up reel 6.

Figure 7:
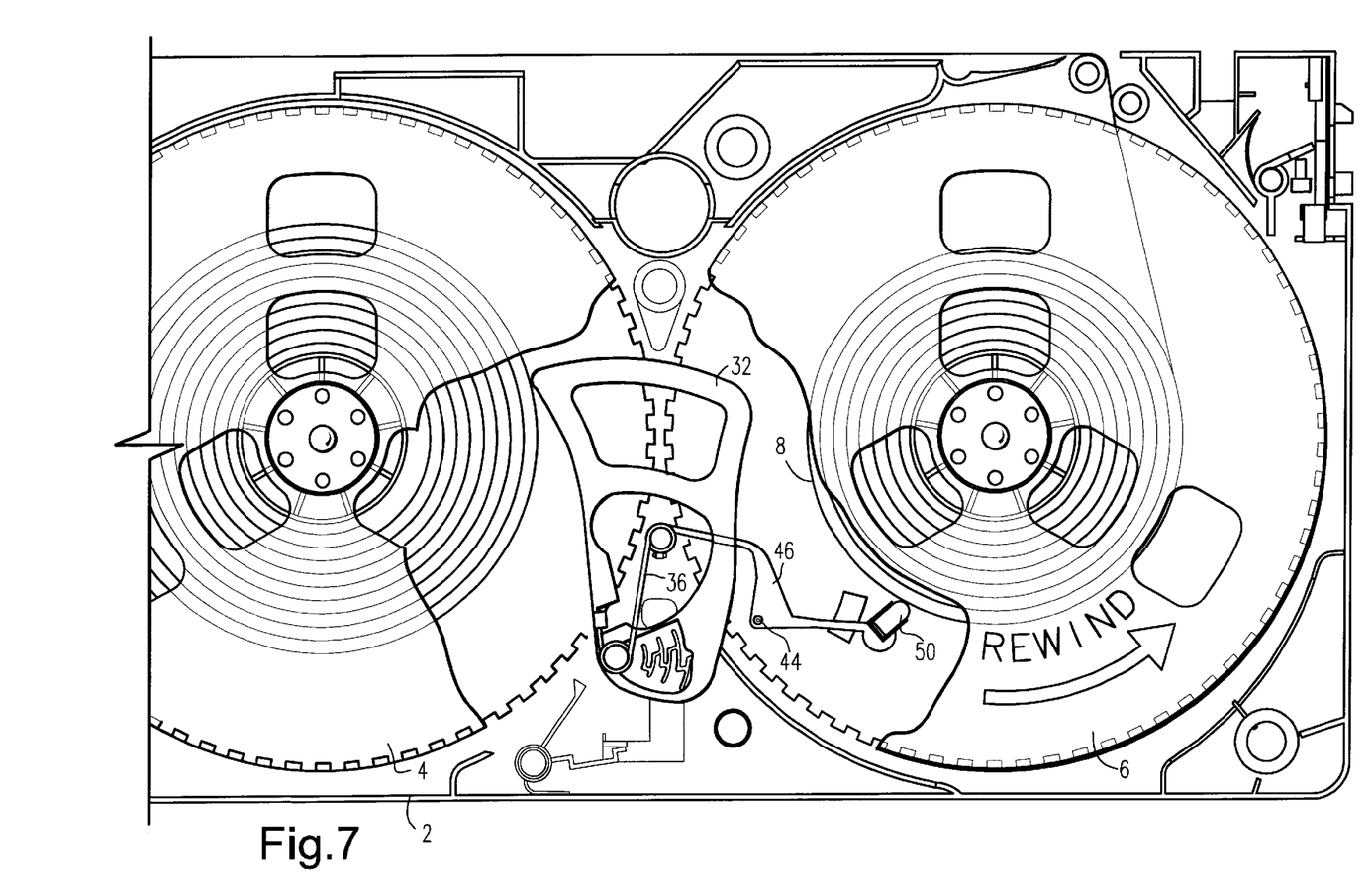

After a predetermined amount of the tape 8 (e.g., one third of the tape) is rewound onto the supply reel 4, as shown in FIG. 7, the additional movement of the follower arm 32 in a counter-clockwise direction under the influence of the spring 36 causes the pin 44 to leave the track 38 through the exit opening 42 such that the erase arm 46 is moved in a counter-clockwise direction by the spring 36 to move the erase head 50 into engagement with the tape 8 on the take-up reel 6. Accordingly, when the tape 8 is thereafter being rewound from the take-up reel 6 to the supply reel 4, as shown in FIG. 7, the erase head 50 is maintained in engagement with the tape on the take-up reel 6 under the force of the spring 36 and thus serves to erase the tape as it is being rewound onto the supply reel 4.

Figure 8:
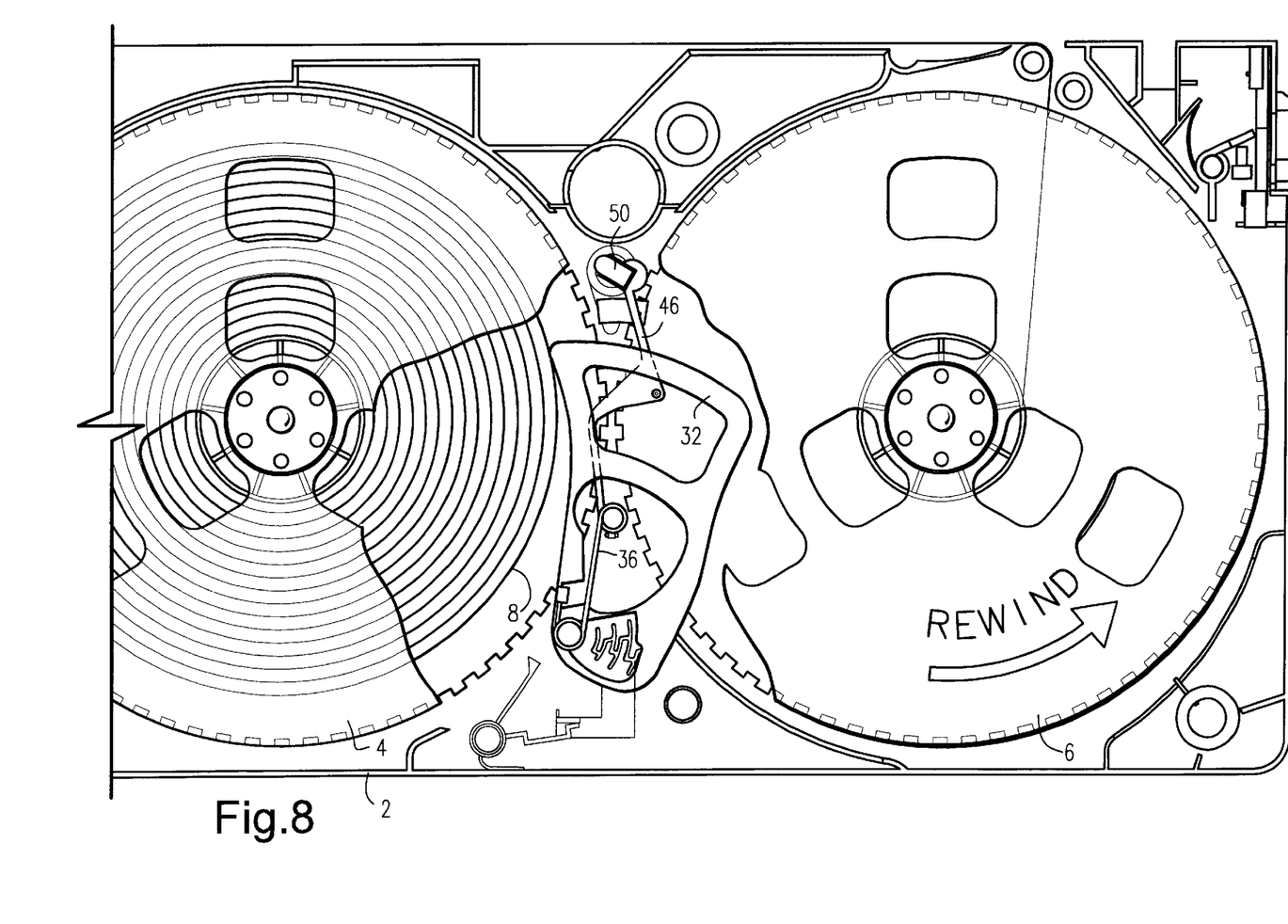

When the tape 8 is fully rewound onto the supply reel 4 from the take-up reel 6 for the second time, as shown in FIG. 8, the spring 36 serves to rotate the erase arm 46 in a counter-clockwise direction such that the erase head 50 is disposed between the supply reel 4 and take-up reel 6 in an inoperative position. Thereafter, the erased cassette tape may be used in a conventional manner to record other subject matter as desired.

Figure 10:
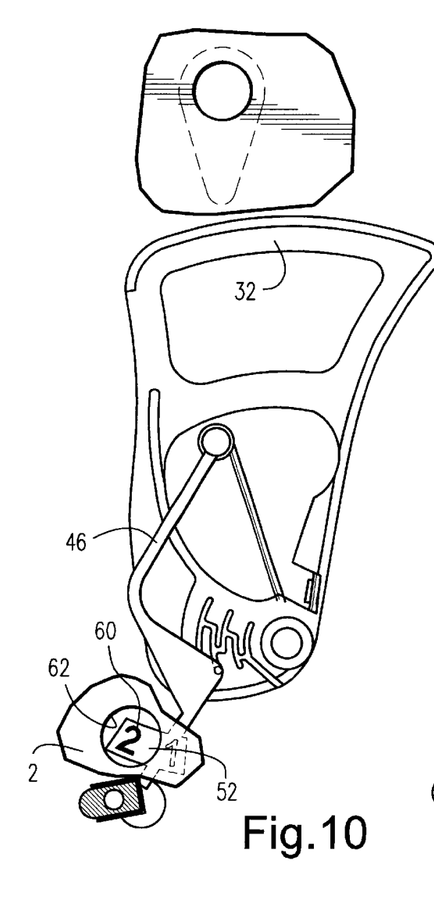
FIGS. 10—12 are bottom plan views of the follower arm, erase arm, erase head and portions of the cassette housing in successive stages of operation in accordance with a second exemplary embodiment of the present invention.
Figure 11:
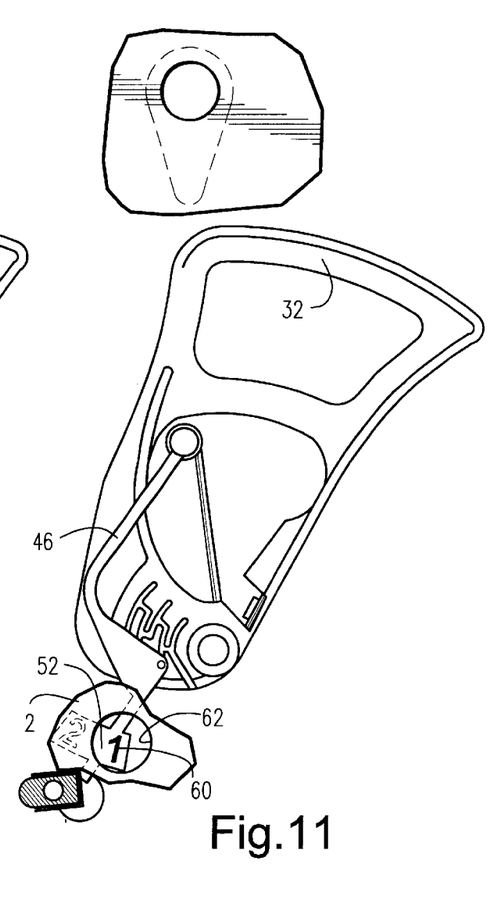
Figure 12:
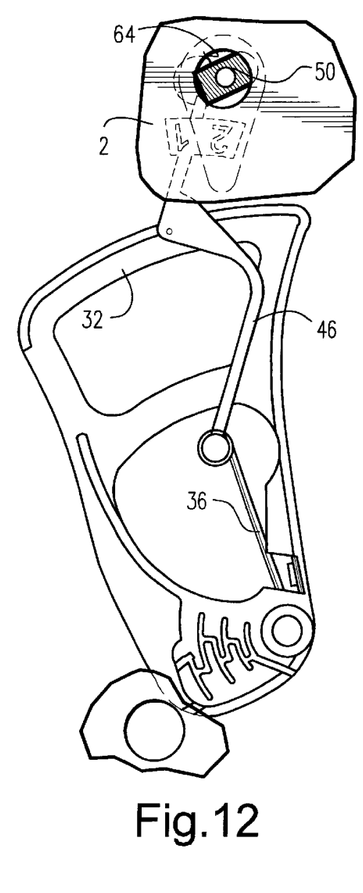

FIGS. 10–12 illustrate a second exemplary embodiment of the present invention wherein the lateral extension 52 on the outer portion of the erase arm 46 is provided with numerical indicia 60 or the like for the purpose of indicating the number of remaining special play cycles for the cassette tape. Referring to FIG. 10, which corresponds to the tape in its initial play position shown in FIG. 3, the numeral 2 shows through an adjacent opening 62 in the rear of the cassette housing 2 for the purpose of indicating that there are two special play cycles remaining on the tape.

As shown in FIG. 11, the numeral 1 shows through the housing opening 62 to indicate that there is one special play cycle remaining on the tape. This corresponds to the tape in its first rewound condition on the supply reel 4, as shown in FIG. 5.

Finally, FIG. 12 corresponds to the condition of the cassette tape shown in FIG. 8 wherein the erase head 50 is moved to an inoperative position and shows through an adjacent opening 64 in the rear of the cassette housing 2.

From the foregoing description, it will be readily seen that the new and improved cassette tape of the present invention is simple in construction, reliable in operation and enables the conventional use of a blank tape after a predetermined number of special uses of the tape.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims

What is claimed is:

1. A limited use tape cassette comprising:
   a housing enclosing a tape spooled to pass from a rotatable supply reel to a rotatable take-up reel during tape play, and from said take-up reel to said supply reel during tape rewind;
   a follower arm pivotally mounted on said housing and being biased to engage spooled tape on one of said reels; and
   an erase arm pivotally mounted on said housing and being movably and releasably connected to said follower arm, said erase arm being biased toward said take-up reel and having a tape erase head thereon;
   whereby upon predetermined movement of said follower arm resulting from predetermined tape movement between said reels, said erase arm is released from said follower arm to move said erase head into engagement with the tape on said take-up reel to erase it as it is being rewound onto said supply reel;
   said follower arm having a track therein, said erase arm having a pin connected thereto, and said pin being positioned in said track for slidable movement therein.

2. The tape cassette of claim 1 wherein said follower arm is biased to engage spooled tape on said supply reel.

3. The tape cassette of claim 1 wherein said follower arm is pivotally mounted on said housing near its proximal end and is positioned to engage said tape near its distal end.

4. The tape cassette of claim 3 wherein said erase arm is pivotally mounted on said housing near its proximal end and said erase head is located at the distal end thereof.

5. The tape cassette of claim 1 wherein said track has an exit opening through which said pin is movable to release said erase arm from said follower arm after said predetermined movement thereof.

6. The tape cassette of claim 5 wherein said pin has an enlarged end on the side of said track opposite to that of said erase arm to prevent inadvertent removal of said pin from said track.

7. The tape cassette of claim 5 wherein said track has spaced generally circumferential portions and generally radial portions extending between said circumferential portions.

8. The tape cassette of claim 1 wherein said follower arm is biased to engage spooled tape on said supply reel and said erase arm is biased toward said take-up reel by a spring.

9. A limited use tape cassette comprising: a housing enclosing a tape spooled to pass from a rotatable supply reel to a rotatable take-up reel during tape play, and from said take-up reel to said supply reel during tape rewind;
   a follower arm pivotally mounted on said housing and being biased to engage spooled tape on one of said reels; and
   an erase arm pivotally mounted on said housing and being movably and releasably connected to said follower arm, said erase arm being biased toward said take-up reel and having a tape erase head thereon;
   whereby upon predetermined movement of said follower arm resulting from predetermined tape movement between said reels, said erase arm is released from said follower arm to move said erase head into engagement with the tape on said take-up reel to erase it as it is being rewound onto said supply reel;
   said erase arm being constructed to be movable without any external intervention of the user to move said erase head to an inoperative position after said erased tape is fully rewound onto said supply reel, thereby enabling said erased tape to be reused.

10. A limited use tape cassette comprising:
    a housing enclosing a tape spooled to pass from a rotatable supply reel to a rotatable take-up reel during tape play, and from said take-up reel to said supply reel during tape rewind;
    a follower arm pivotally mounted on said housing and being biased to engage spooled tape on one of said reels; and
    an erase arm pivotally mounted on said housing and being movably and releasably connected to said follower arm, said erase arm being biased toward said take-up reel and having a tape erase head thereon;
    whereby upon predetermined movement of said follower arm resulting from predetermined tape movement between said reels, said erase arm is released from said follower arm to move said erase head into engagement with the tape on said take-up reel to erase it as it is being rewound onto said supply reel;
    said follower arm being pivotally mounted on said housing near its proximal end and being positioned to engage said tape near its distal end; and
    said follower arm having a track therein near said proximal end thereof, said erase arm having a pin connected thereto near the mid-portion thereof, and said pin being positioned in said track for slidable movement therein.

11. The tape cassette of claim 10 wherein said erase arm is pivotally connected to said housing at the proximal end thereof, and said mid-portion thereof is offset from said proximal end.

12. The tape cassette of claim 11 wherein said follower arm is biased to abut spooled tape on said supply reel.

13. A limited use tape cassette comprising:

a housing enclosing a tape spooled to pass from a rotatable supply reel to a rotatable take-up reel during tape play, and from said take-up reel to said supply reel during tape rewind;

a follower arm pivotally mounted on said housing near its proximal end and being biased to engage at its distal end spooled tape on said supply reel; and an erase arm pivotally mounted on said housing near its proximal end and being movably and releasably connected to said follower arm, said erase arm being biased toward said take-up reel and having a tape erase head on the distal end thereof;

whereby upon predetermined movement of said follower arm resulting from predetermined tape movement between said reels, said erase arm is released from said follower arm to move said erase head into engagement with the tape on said take-up reel to erase it as it is being rewound onto said supply reel;

said follower arm having a track therein near said proximal end thereof, said erase arm having a pin connected thereto near the mid-portion thereof, and said pin being positioned in said track for slidable movement therein.

14. The tape cassette of claim 13 wherein said track has an exit opening through which said pin is movable to release said erase arm from said follower arm after said predetermined movement thereof.

15. The tape cassette of claim 14 wherein said pin has an enlarged end on the side of said track opposite to that of said erase arm to prevent inadvertent removal of said pin from said track.

16. The tape cassette of claim 14 wherein said track has spaced generally circumferential portions and generally radial portions extending between said circumferential portions.

17. The tape cassette of claim 13 wherein a spring biases said follower arm to engage said tape and biases said erase arm toward said take-up reel.

18. A method for limiting the use of tape cassette having a supply reel and a take-up reel, said method comprising the steps of:

(a) following a radial dimension of spooled tape on one of said supply reels during tape play with a pivoted follower arm;

(b) using movement of said follower arm to release a pivoted erase arm releasably connected thereto and having an erase head, after an initial period of tape play;

(c) using movement of said erase arm to engage tape on the take-up reel with said erase head to erase said tape as it is being rewound onto the supply reel; and (d) without any external intervention of the user, moving said erase arm and erase head to an inoperative position after the tape is erased to enable the tape to be used to record other subject matter.

19. The method of claim 18 wherein said follower arm follows a radial dimension of tape on said supply reel.

20. The method of claim 19 wherein a spring is used to bias the follower arm into engagement with the tape on the supply reel and to bias said erase arm toward the take-up reel.

21. A limited use tape cassette comprising:

a housing enclosing a tape spooled to pass from a rotatable supply reel to a rotatable take-up reel during tape play, and from said take-up reel to said supply reel during tape rewind;

a follower arm pivotally mounted on said housing near its proximal end and being biased to engage at its distal end spooled tape on said supply reel; and an erase arm pivotally mounted on said housing near its proximal end and being movably and releasably connected to said follower arm, said erase arm being biased toward said take-up reel and having a tape erase head on the distal end thereof;

whereby upon predetermined movement of said follower arm resulting from predetermined tape movement between said reels, said erase arm is released from said follower arm to move said erase head into engagement with the tape on said take-up reel to erase it as it is being rewound onto said supply reel;

said erase arm being constructed to be movable without any external intervention of the user to move said erase head to an inoperative position after said erased tape is fully rewound onto said supply reel, thereby enabling said erased tape to be reused.

22. The tape cassette of claim 21 wherein said housing has an opening through which said erase head is visible when in said inoperative position.

* * * * *